(12) United States Patent
Welch

(10) Patent No.: US 9,711,956 B1
(45) Date of Patent: Jul. 18, 2017

(54) HINGED CABLE GUIDE

(71) Applicant: Lee D. Welch, Springfield, IL (US)

(72) Inventor: Lee D. Welch, Springfield, IL (US)

( * ) Notice: Subject to any disclaimer, the term of this patent is extended or adjusted under 35 U.S.C. 154(b) by 147 days.

(21) Appl. No.: 14/716,949

(22) Filed: May 20, 2015

Related U.S. Application Data

(60) Provisional application No. 62/001,094, filed on May 21, 2014.

(51) Int. Cl.
*H02G 1/08* (2006.01)
*H02G 15/007* (2006.01)

(52) U.S. Cl.
CPC ......... *H02G 1/085* (2013.01); *H02G 15/007* (2013.01)

(58) Field of Classification Search
USPC .................................... 254/134.3 R
See application file for complete search history.

(56) References Cited

U.S. PATENT DOCUMENTS

| | | | | |
|---|---|---|---|---|
| 527,414 A * | 10/1894 | Dewees | ............... | H01B 11/002 174/14 R |
| 3,086,629 A * | 4/1963 | Blitzer | ..................... | E06B 9/01 138/111 |
| 3,739,459 A * | 6/1973 | Otani | ........................ | E02D 5/28 138/154 |
| 3,916,089 A * | 10/1975 | Sloan | ...................... | B60M 1/34 174/164 |
| 5,027,478 A * | 7/1991 | Suhr | ...................... | B65H 75/36 137/355.16 |
| 5,027,864 A | 7/1991 | Conti et al. | | |
| 5,184,794 A * | 2/1993 | Saito | ........................ | F16L 3/13 248/316.5 |
| 5,481,939 A * | 1/1996 | Bernardini | ......... | H01R 13/5804 439/589 |
| 5,566,622 A * | 10/1996 | Ziaylek, Jr. | ............ | A62C 33/06 104/275 |
| 5,613,655 A * | 3/1997 | Marion | ................. | F16L 3/2235 24/339 |
| D395,815 S * | 7/1998 | Walters | ......................... | D8/354 |
| 5,780,773 A * | 7/1998 | Wakamatsu | ............. | H02G 9/04 174/72 C |
| 5,957,056 A * | 9/1999 | Behar | ....................... | B61B 3/00 104/173.1 |
| 5,992,802 A * | 11/1999 | Campbell | ................ | H02G 3/30 248/68.1 |
| D421,318 S * | 2/2000 | O'Brien | ...................... | D26/138 |
| 6,131,289 A * | 10/2000 | Tarpill | ................ | H02G 1/1295 30/90.1 |
| D436,578 S | 1/2001 | Henry | | |
| 6,262,371 B1 | 7/2001 | Allen | | |
| 6,552,270 B1 * | 4/2003 | Heacox | .................... | F16L 3/233 174/135 |
| 6,747,212 B1 * | 6/2004 | Henry | .................... | H02G 3/283 104/275 |

(Continued)

FOREIGN PATENT DOCUMENTS

WO     WO 02075888 A2 *  9/2002  ........... G02B 6/4471

*Primary Examiner* — Alvin Grant
(74) *Attorney, Agent, or Firm* — Philip L. Bateman

(57) ABSTRACT

A cable guide is made of four sections that are connected in series with three hinges. In the closed position, the cable guide forms a cylinder with four enclosed openings for four parallel cables. In the open position, the cable guide is linear with each section having a cylindrical slot for receiving a cable.

15 Claims, 8 Drawing Sheets

(56) References Cited

U.S. PATENT DOCUMENTS

| | | | | |
|---|---|---|---|---|
| 6,878,881 | B1 * | 4/2005 | Henry | H02G 9/04 104/275 |
| 6,915,870 | B2 * | 7/2005 | Sugiyama | B60R 16/06 180/69.4 |
| 6,963,031 | B2 * | 11/2005 | Gladfelter | F16L 3/26 174/74 A |
| 6,979,776 | B1 * | 12/2005 | Zimmermann | H02G 1/06 138/111 |
| 7,156,584 | B2 * | 1/2007 | Trichard | H02G 1/08 254/134.3 R |
| 7,319,802 | B2 | 1/2008 | Morris | |
| D597,403 | S * | 8/2009 | Ho | D8/356 |
| D601,879 | S * | 10/2009 | Kim | D8/356 |
| 7,633,010 | B2 | 12/2009 | Ayoub | |
| 7,900,892 | B2 * | 3/2011 | Student | C10M 103/00 254/134.3 R |
| 8,020,811 | B2 * | 9/2011 | Nelson | F16L 3/2235 174/68.1 |
| D648,211 | S * | 11/2011 | Weaver | D8/396 |
| D648,685 | S | 11/2011 | Symons | |
| 8,047,506 | B2 * | 11/2011 | Student | C10M 103/00 254/134.3 R |
| D691,877 | S * | 10/2013 | Ganski | D8/356 |
| 9,155,976 | B1 * | 10/2015 | Mosquera | A63H 33/08 |
| 2003/0173470 | A1 * | 9/2003 | Geiger | F16L 55/035 248/55 |
| 2005/0245141 | A1 * | 11/2005 | Ifort | H02G 3/0462 439/761 |
| 2007/0128939 | A1 * | 6/2007 | Low | H02G 3/30 439/607.41 |
| 2007/0130760 | A1 | 6/2007 | Washburn | |
| 2015/0144396 | A1 * | 5/2015 | Tanaka | H02G 15/007 174/668 |
| 2016/0181773 | A1 * | 6/2016 | Buennigmann | H02G 1/1224 30/91.2 |

* cited by examiner

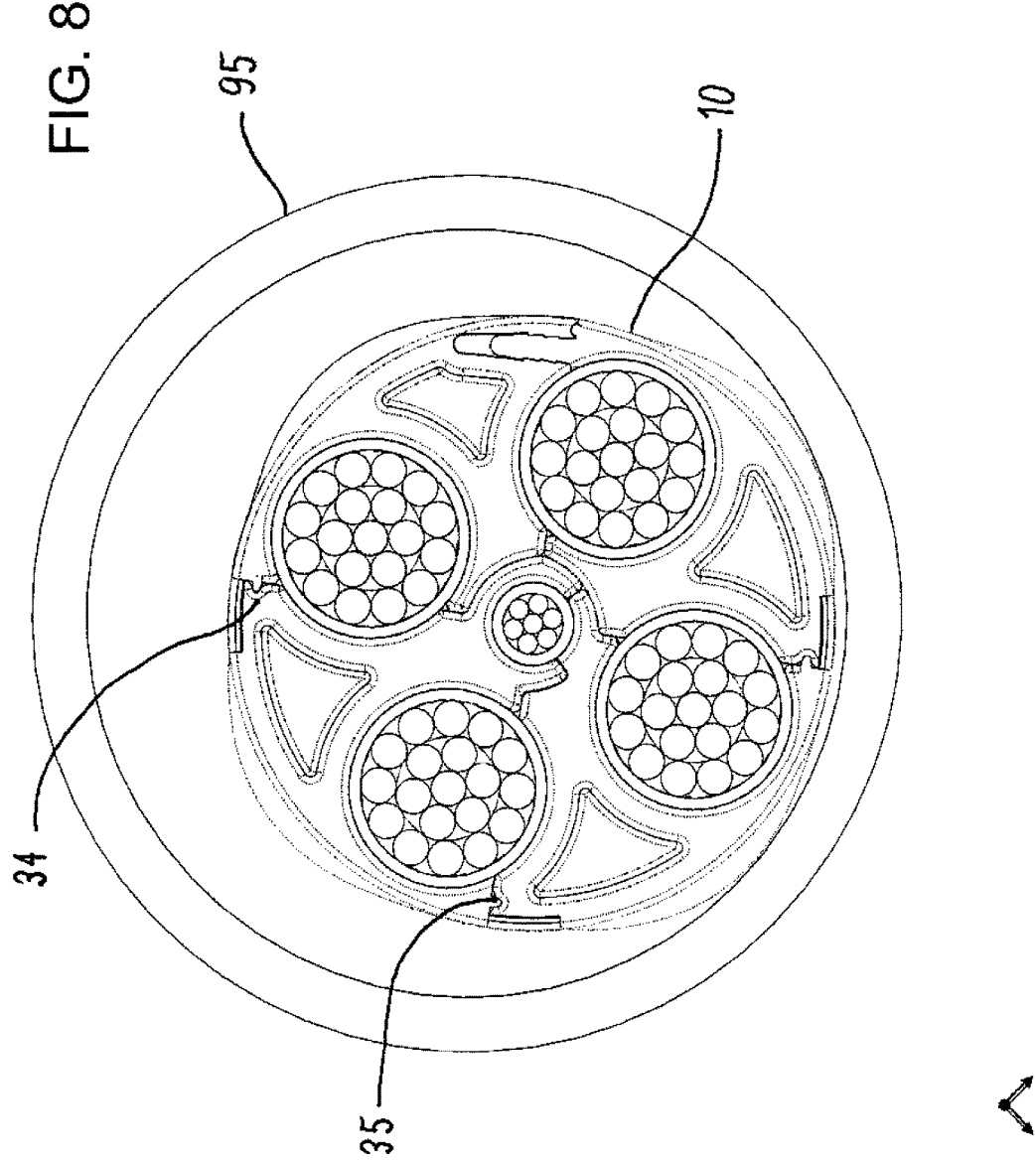

HINGED CABLE GUIDE

CROSS-REFERENCE TO RELATED APPLICATION

This application claims the benefit of U.S. Provisional Application Ser. No. 62/001,094, May 21, 2014.

FIELD OF THE INVENTION

This invention relates to electricity. More particularly, this invention relates to electrically conducting cables installed in protective conduits.

BACKGROUND OF THE INVENTION

Electricity is transmitted from generating stations to electrically-powered devices by metal conductors. The preferred metal is copper because of its excellent conductivity and relatively low price. The metal conductors are known as wires when they consist of relatively small diameter single strands and are known as cables when they consist of multiple strands wound together. Both wire and cable are commonly coated with a flexible plastic insulator. Most electrically-powered devices are connected with at least three separate wires or cables, one is known as the positive, one is known as the negative or neutral, and one is a ground cable whose purpose is to carry the current to the Earth in the event of a malfunction.

On an atomic level, the flow of electricity is the movement of electrons. The movement generates friction and the friction generates heat. The diameter of the conductor must be large enough to prevent the generation of excessive heat. The minimum safe diameter of the conductor is thus a function of the voltage and current of the electricity. For example, 12 gauge (American wire gauge) copper wiring having a diameter of about 0.08 inches (about 3.2 mm) is used for many residential circuits (120 volts and 20 amperes) whereas copper cable for industrial use is often one inch (about 2.5 cm) or more in diameter.

For residential and commercial buildings, three or four insulated wires preformed within a flexible plastic sheath are commonly used for the electrical system. For industrial applications, the wires or cables are usually placed within a rigid enclosure made of metal or hard plastic at the installation site. The enclosures are commonly known as conduits when they have a round cross section and are commonly known as raceways when they have a rectangular cross section. The term "conduit" is used herein to refer to any type of rigid enclosure for wires and cables. The conduit provides additional protection and safety for the wires and cables. The installation process requires the wires and cables to be pulled through the conduit.

Pulling large diameter cables through a conduit is difficult because the cables tend to bind with each other and to rub against the inside wall of the conduit. While pulling through a straight conduit can be difficult, pulling through curved sections of conduit is even more difficult. Electricians commonly coat the cables with a solution of soapy water or other lubricant to reduce friction as they are pulled through a conduit.

A variety of conduit inserts have been disclosed. For example, Conti et al., U.S. Pat. No. 5,027,864, Jul. 2, 1991; Allen, U.S. Pat. No. 6,262,371, Jul. 17, 2001; Washburn, U.S. Pat. Appln. Publn. No. 2007/0130760, Jun. 14, 2007; and Morris, U.S. Pat. No. 7,319,802, Jan. 15, 2008, disclose conduit inserts that run the entire length of the conduit and separate individual cables within the conduit. These conduit inserts require the cables to be fed simultaneously into the inserts. It is very difficult to precisely align and then feed three or more bulky cables simultaneously into a conduit insert.

A variety of cable supports and protectors have also been disclosed. For example, Henry, U.S. Pat. No. D436,578, Jan. 23, 2001; Wakamatsu, U.S. Pat. No. 5,780,773, Jul. 14, 1998; Ayoub, U.S. Pat. No. 7,633,010, Dec. 15, 2009; and Symons, U.S. Pat. No. D648,685, Nov. 15, 2011, disclose cable supports and protectors that separate cables. However, these cable supports and protectors are not suitable for use in conduits.

Accordingly, there is a demand for an improved cable guide that enables multiple cables to be separated in a conduit at desired intervals and that can be placed onto the cables without requiring the cables to be fed into and through the guide.

SUMMARY OF THE INVENTION

The general object of this invention is to provide an improved cable guide that enables multiple cables to be separated in a conduit at desired intervals and that can be placed onto the cables without requiring the leading end of the cables to be fed into and through the guide.

I have invented an improved cable guide. The cable guide comprises four sections of an insulating material that are connected in series with a first section connected to a second section along a first hinge, the second section connected to a third section along a second hinge, and the third section connected to a fourth section along a third hinge. The four sections forming a cylinder when in a closed position, the cylinder having a circular front face, a circular rear face, and a center axis, the cylinder having four enclosed openings extending from the front face to the rear face, the openings being equally spaced radially about the center axis. Each section has a cylindrical slot of greater than 180 degrees that forms one of the four openings with a first adjacent section and has a cylindrical recess of less than 180 degrees that forms one of the four openings with a second adjacent section. The four sections form a linear alignment when in the open position with the cylindrical slot of each section opening in the same direction.

The cable guide of this invention enables multiple cables to be separated in a conduit at desired intervals. The cable guide can be placed onto the cables without requiring the leading end of the cables to be fed into and through the guide.

BRIEF DESCRIPTION OF THE DRAWINGS

FIG. 8 is an end view thereof inside a conduit.

DETAILED DESCRIPTION OF THE INVENTION

1. Preferred Embodiment

Figure 1:
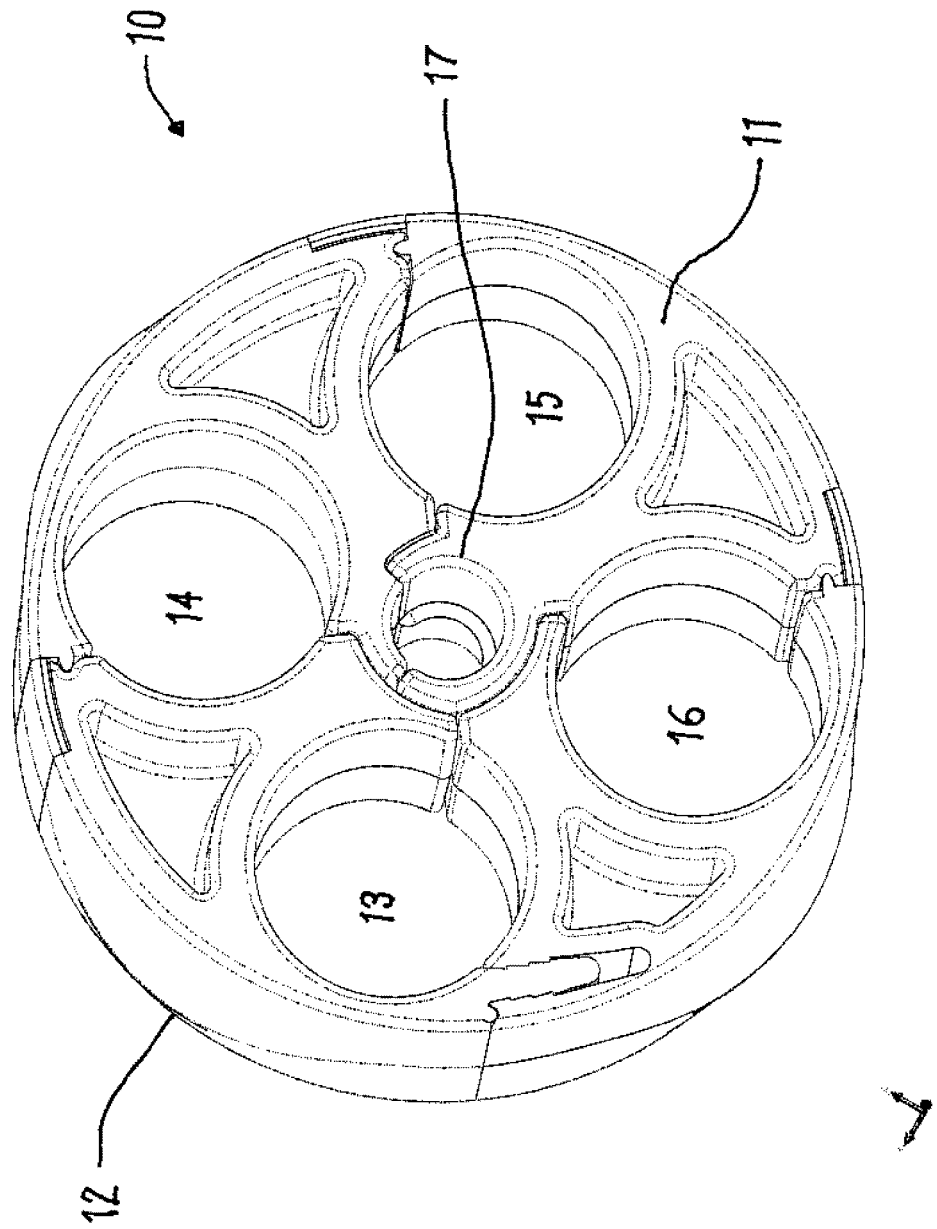
FIG. 1 is a perspective view of a preferred embodiment of the cable guide of this invention in the closed position.

This invention is best understood by reference to the drawings. A preferred embodiment of the cable guide 10 of this invention has a closed position as shown in FIG. 1, a transitional position shown in FIG. 2, and an open position shown in FIG. 3. As explained in detail below, cables about to be pulled into a conduit are placed into the cable guide when it is in the open position. The cable guide is then moved to the closed position to connect and enclose the cables to the cable guide. The cables and cable guide are then pulled into the conduit. At desired spacings, additional cable guides are connected. Terms referring to shape are used herein to refer to the general shape and include minor variations that do not affect the function.

Referring now to FIG. 1, the cable guide is cylindrical in shape when in the closed position. The cylinder has a circular front face 11, a circular rear face 12, and a center longitudinal axis. The preferred embodiment of the cable guide contains four openings, a first opening 13, a second opening 14, a third opening 15, and a fourth opening 16 to accommodate four large diameter cables. The openings are equally spaced radially about the center axis. In other words, they are centered at the geometric azimuth positions of 0, 90, 180, and 270 degrees. These positions can alternatively be referred to as the 12, 3, 6, and 9 o'clock positions on a clock face. The preferred embodiment contains a fifth opening 17 that is centrally located and smaller in diameter.

Figure 2:
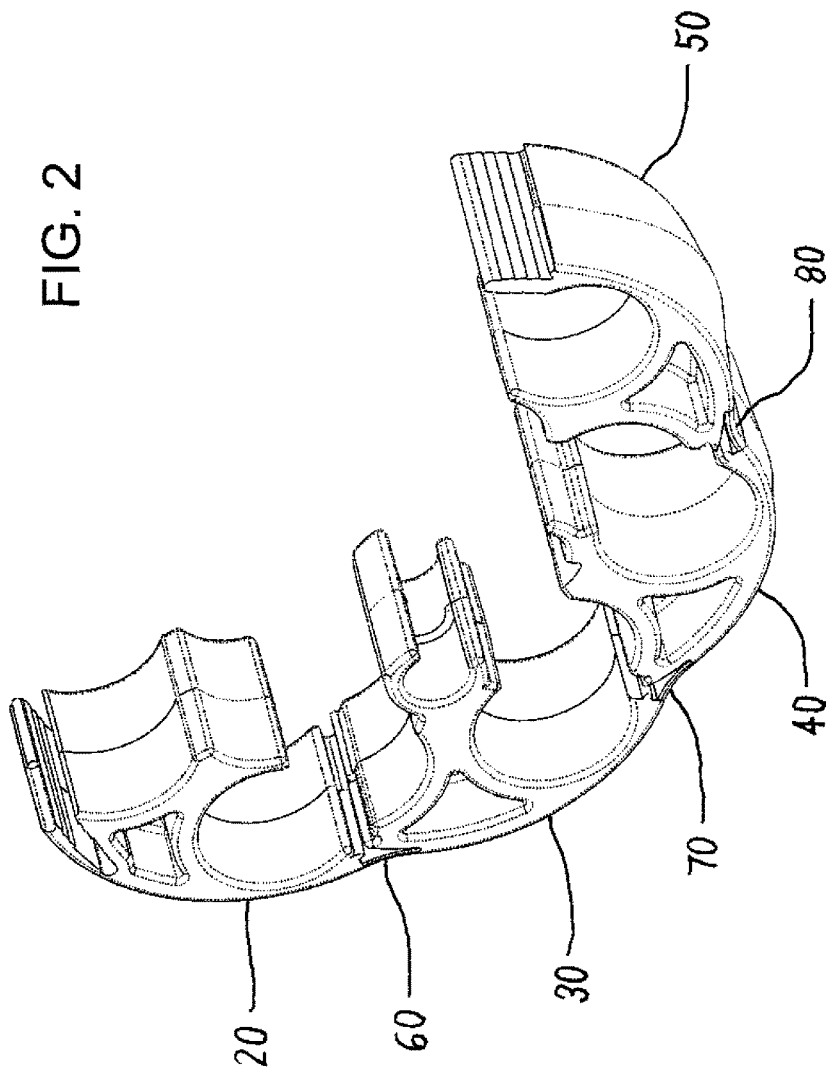
FIG. 2 is a perspective view thereof in a position that is transitional from closed to open.

Referring now to FIG. 2, the cylinder is formed of four wedge-like sections, a first section 20, a second section 30, a third section 40, and a fourth section 50. The sections are joined together by three hinges, a first hinge 60 connects the first section and the second section, a second hinge 70 connects the second section and the third section, and a third hinge 80 connects the third section and the fourth section. The outer wall of each section forms ninety degrees of the outer wall of the cable guide in the closed cylindrical position.

Figure 3:
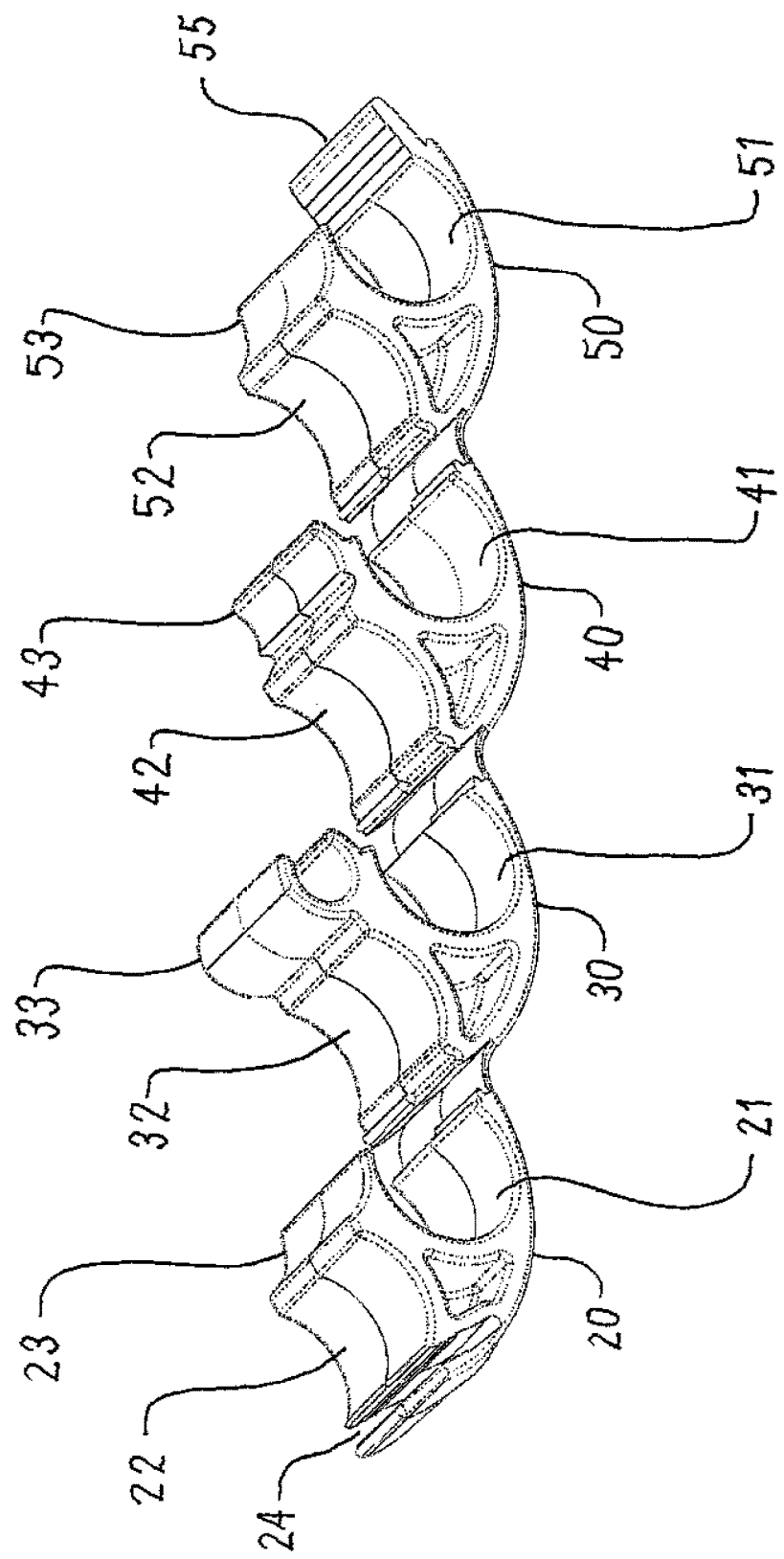
FIG. 3 is a perspective view thereof in the open position.

Referring now to FIG. 3, the sections are shown arranged in the open position ready to accept cables. Each section contains a cylindrical slot 21, 31, 41, and 51. Each slot has a closed (enclosed) portion of greater than 180 degrees and an open (exposed) portion of less than 180 degrees. In other words, the closed portion forms a central angle of greater than 180 degrees and the open portion forms a central angle of less than 180 degrees. In the preferred embodiment the closed portion is about 270 degrees and the open portion is about ninety degrees. As explained in detail below, each slot is adapted to receive a cable. Each slot then combines with a recess of an adjacent section to form one of the openings when the cable guide is in the closed position.

Each section also contains a cylindrical recess 22, 32, 42, and 52. Each recess has a closed portion of less than 180 degrees and an open portion of greater than 180 degrees. In the preferred embodiment, the closed portion is about ninety degrees and the open portion is about 270 degrees. Each recess combines with a slot of an adjacent section to form one of the openings when the cable guide is in the closed position.

In the preferred embodiment, each section also contains a second cylindrical recess 23, 33, 43, and 53. The recesses form the center opening when the cable guide is in the closed position. In the preferred embodiment, the recesses of the second section and the third section mate to form a center circular opening. The recesses of the first and fourth sections surround and secure the center circular opening. Alternatively, each section contains a similarly shaped recess having a closed portion of about ninety degrees.

The first section and the fourth section connect together when in the closed position. The connection is preferably of the non-permanent type so that the sections can be disconnected if desired. In the preferred embodiment, the first section has a groove 24 that mates with a tongue 55 in the fourth section. The tongue and groove preferably contain ridges to provide additional security to the connection. Other connection mechanisms, such as latches, posts, and the like are also suitable. In the preferred embodiment, each other pair of adjacent sections interlocks with a smaller tongue and a groove to provide additional rigidity. The groove 34 and the tongue 35 of the second section are best seen in FIG. 8.

Each of the four sections of the preferred embodiment contains an opening having a generally triangular cross sectional shape to reduce weight and the amount of material. Reducing the amount of material reduces cost.

In the preferred embodiment, each of the sections has an outer surface that bulges outwardly slightly. The cable guide thus has a cross-sectional shape that is not perfectly circular. The purpose of the bulges is to decrease the surface area of contact between the cable guide and the interior wall of the conduit and to thereby reduce friction as the cable guides and cables are being pulled through the conduit.

The cable guide is made of an insulating material. The material is preferably moldable with a low coefficient of friction so that it slides easily inside a conduit. Preferred materials include thermoplastics such as polypropylene, polyethylene, polycarbonate, acrylonitrile butadiene styrene (ABS), polyamide, polyester, and the like. The most preferred material is polypropylene because of its resistance to high temperatures, low coefficient of friction, insulating properties, hardness, and malleability.

The size of the cable guide is determined by the cables and conduit with which it will be used. The diameters of the openings of the cable guide are at least equal to the diameters of the cables. The outer diameter of the cable guide is less than the inner diameter of the conduit into which it will be inserted. The diameter of the cable guide is preferably about 50 to 90 percent of the inner diameter of the conduit. The thickness of the cable guide (from front face to rear face) is generally about three-fourths to two inches. If the cable guide is too thin, the hinges are prone to failure. If the cable guide is too thick, cost is increased without any corresponding improvement in functioning.

The cable guide is preferably molded as an integral unit. However, molding as an integral unit requires precision with the hinges. If the hinges are too thick, the sections do not close easily. If the hinges are too thin, there is a danger of tearing or other disconnection of the sections. An alternative manufacturing method is to mold the sections individually and then to attach the three hinges with adhesive, fasteners, or the like.

2. Use

Figure 4:
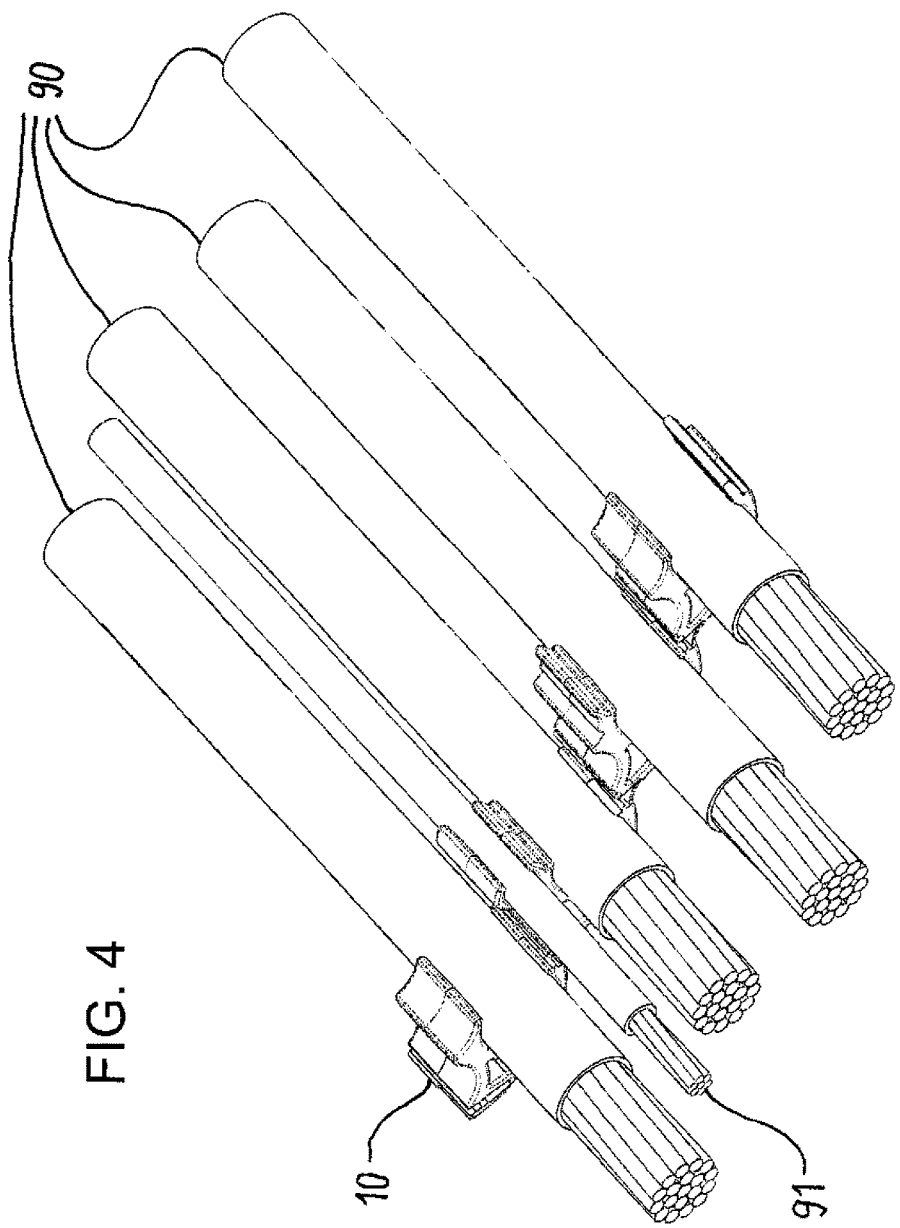
FIG. 4 is a perspective view thereof in the open position with four larger cables and one smaller cable in place.

The use of the cable guide can now be considered. Referring now to FIG. 4, the cable guide is placed into the linear open position to accept cables. The term "linearly" is used herein to mean that the sections are arranged so that a cable can simultaneously be placed into each slot. Up to four larger cables 90 are arranged in parallel and placed into the slots of the four sections. A smaller cable 91 or smaller diameter wires of the type commonly used for grounding or control purposes are placed in the center opening. If one of the larger openings is not used, the smaller cable and wires can be placed into the unused large opening. In FIG. 4, the insulation on the cables is omitted at one end for illustration purposes. The cables are also shown as being relatively short sections for illustration purposes. The cables are generally very long.

Figure 5:
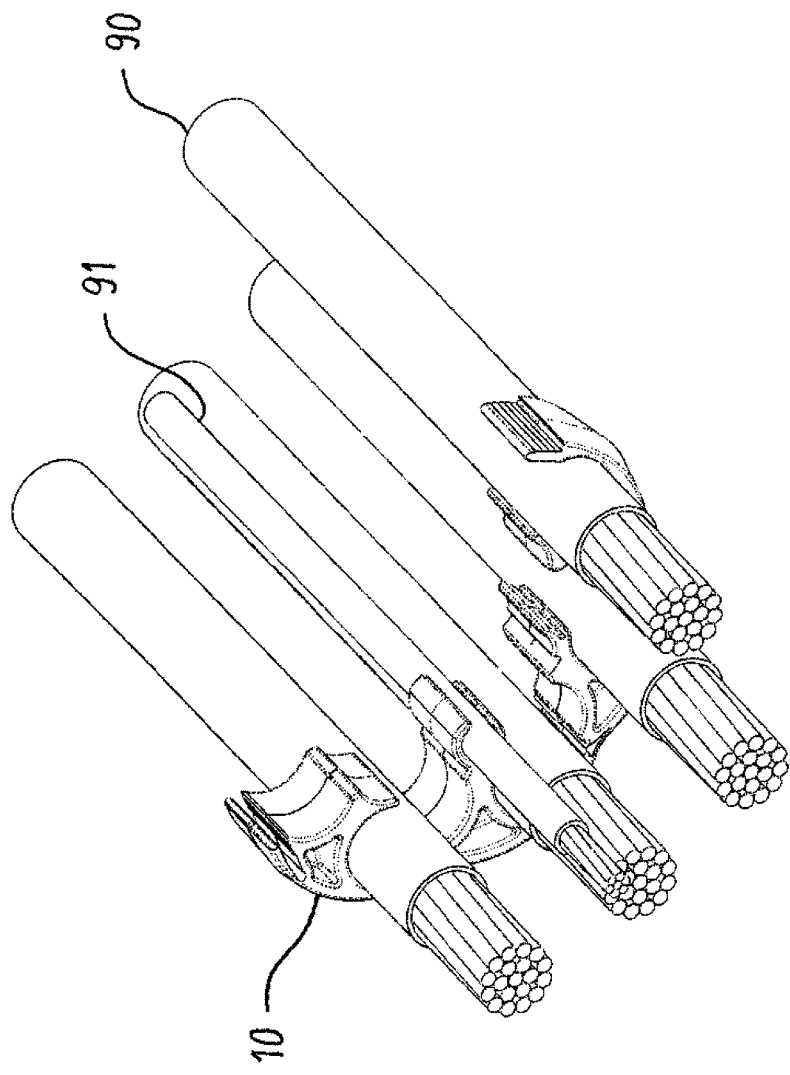
FIG. 5 is a perspective view thereof in a position that is transitional from open to closed.
Figure 6:
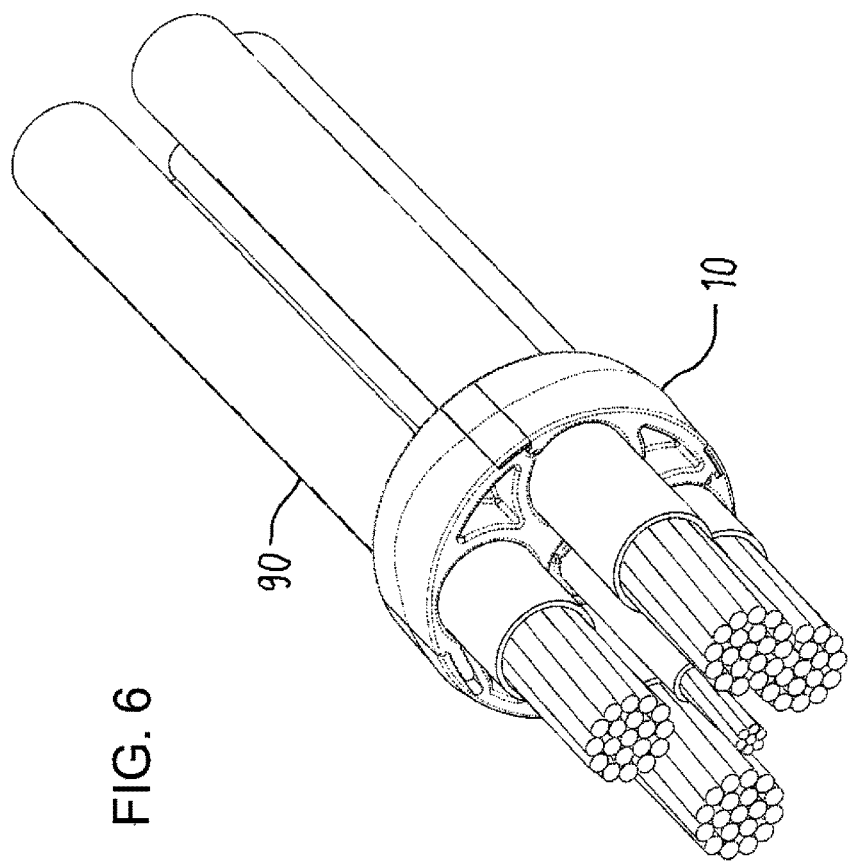
FIG. 6 is a perspective view thereof in the closed position.
Figure 7:
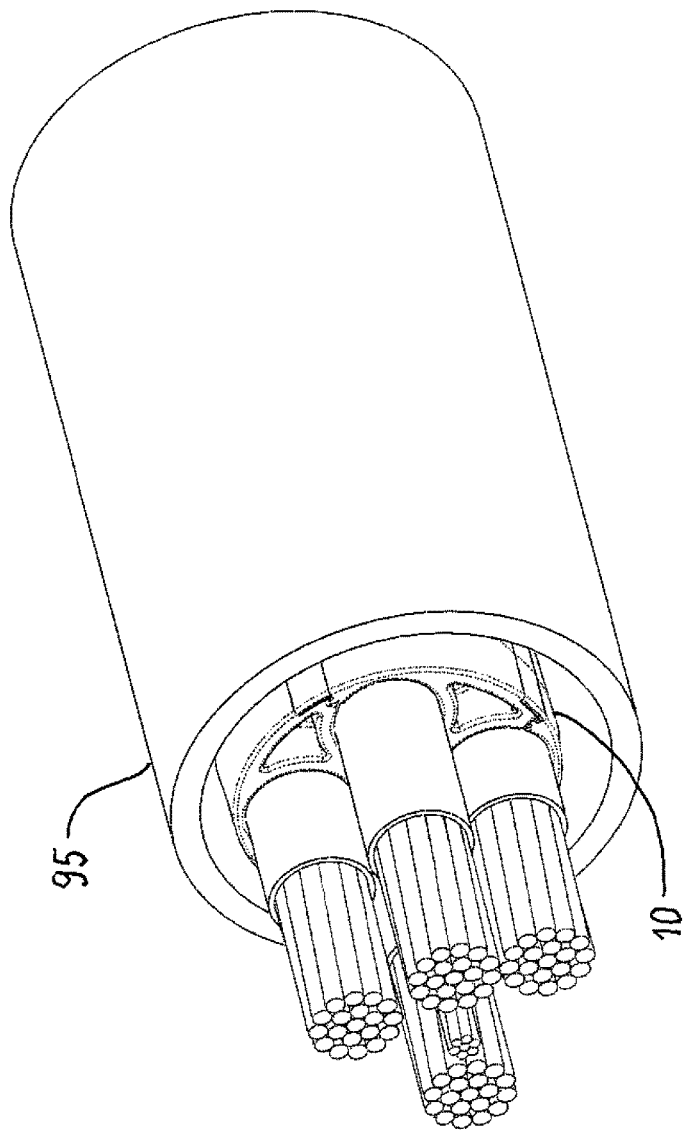
FIG. 7 is a perspective view thereof being inserted into a conduit.

After the cables are placed as desired into the cable guide, the cable guide is moved toward the closed position as shown in FIG. 5. The cables and the cable guide are shown in the fully closed position in FIG. 6. The cables and cable guide are then pulled into a conduit 95 as shown in FIG. 7. The cables and cable guide inside the conduit are shown from an end in FIG. 8.

The cable guides are generally placed onto the cables at one of two times. As described above, one time is as the cables are being pulled into a conduit at the place of installation. Another time is as the cables are being placed onto a spool at the place of manufacture. An advantage of placing the cable guides on the cables as they are spooled is that this can be done very efficiently and automatically at the place of manufacture, thus eliminating the need for an electrician to place the cable guides on the cables at the place of installation.

Additional cable guides are placed on the cables at the desired spacings. The optimal spacing of the cable guides depends on many factors, including cable size, number of cables, conduit size, conduit material, and conduit path (including length and bends). The cable guides are generally spaced about one to ten feet apart and preferably about two to three feet apart.

3. Alternate Embodiments

While the preferred embodiment has four sections and four primary openings, the number of sections and the corresponding number of openings can be varied from two to five or more. As previously mentioned, the center opening can be omitted. While the preferred embodiment has bulges on the exterior wall surface, the cable guide can be perfectly circular and/or can contain ridges, rails, or other protuberances to further reduce friction between the cable guide and the inner wall of the conduit.

4. Advantages

The cables with spaced apart cable guides are much easier to pull through a conduit than the cables by themselves for several reasons. First, the cable guides keep the cables parallel and prevent them for wrapping around each other. Second, the cable guides reduce the friction between the cables and the inner wall of the conduit. As a result, soaping or otherwise lubricating the cables is not necessary. These same features make removal of the cables easier if repair, modification, or removal is needed after installation.

Another benefit of the cable guides is that they maintain space between the cables and thus provide additional heat dissipation. By reducing heat for a given electrical load, the use of the cable guide allows smaller diameter cables to be safely used with a resulting savings in cost. The cable guides are easy to use, inexpensive, durable, and reusable.

I claim:

1. A cable guide comprising four sections of an insulating material that are connected in series with a first section connected to a second section along a first hinge, the second section connected to a third section along a second hinge, and the third section connected to a fourth section along a third hinge, the four sections forming a cylinder when in a closed position, the cylinder having a circular front face, a circular rear face, and a center axis, the cylinder having four enclosed openings extending from the front face to the rear face, the openings being equally spaced radially about the center axis, each section having a cylindrical slot of greater than 180 degrees that forms one of the four openings with a first adjacent section and having a cylindrical recess of less than 180 degrees that forms one of the four openings with a second adjacent section, the four sections forming a linear alignment when in the open position with the cylindrical slot of each section opening in the same direction.

2. The cable guide of claim 1 wherein the sections are made of polypropylene.

3. The cable guide of claim 1 additionally comprising a tongue on the first section and a groove on the fourth section that connect to secure the cable guide in the closed position.

4. The cable guide of claim 1 wherein the cylinder has a fifth central opening and wherein each section has a cylindrical recess forming a portion of the fifth central opening.

5. The cable guide of claim 4 wherein the cable guide is an integral unit.

6. A cable guide comprising three to five sections of an insulating material that are connected in series with a leading section, one or more inner sections, and a trailing section, the sections being connected by hinges and forming a cylinder with each section having two adjacent sections when in a closed position, the cylinder having a circular front face, a circular rear face, and a center axis, the cylinder having a number of enclosed openings at least equal to the number of sections, each opening extending from the front face to the rear face, the openings being equally spaced radially about the center axis, each section having a cylindrical slot of equal to or greater than 180 degrees that forms one of the openings with a first adjacent section and having a cylindrical recess of equal to or less than 180 degrees that forms one of the openings with a second adjacent section, the sections capable of forming a linear alignment when in the open position with the cylindrical slots of each section opening in the same direction.

7. The cable guide of claim 6 wherein the sections are made of polypropylene.

8. The cable guide of claim 6 additionally comprising a tongue on the leading section and a groove in the trailing section that connect to secure the cable guide in the closed position.

9. The cable guide of claim 6 wherein the cylinder has a central opening and wherein each section has a recess forming a portion of the central opening.

10. The cable guide of claim 6 wherein the cable guide is an integral unit.

11. A cable guide comprising three to five sections of an insulating material that are connected in series with a leading section, one or more inner sections, and a trailing section, the sections being connected by hinges and forming a cylinder with each section having two adjacent sections when in a closed position, the cylinder having a circular front face and a circular rear face, the cylinder having a number of enclosed openings at least equal to the number of sections, each opening extending from the front face to the rear face, each section having a cylindrical slot with a closed portion of equal to or greater than 180 degrees that forms one of the openings with a first adjacent section and having a cylindrical recess with a closed portion of equal to or less than 180 degrees that forms one of the openings with a second adjacent section.

12. The cable guide of claim 11 wherein the sections are made of polypropylene.

13. The cable guide of claim 11 additionally comprising a tongue on the leading section and a groove in the trailing section that connect to secure the cable guide in the closed position.

14. The cable guide of claim 11 wherein the cylinder has a central opening and wherein each section has a recess forming a portion of the central opening.

15. The cable guide of claim 11 wherein the cable guide is an integral unit.

\* \* \* \* \*